(12) United States Patent
Biasone

(10) Patent No.: US 12,534,488 B2
(45) Date of Patent: Jan. 27, 2026

(54) PROCESS FOR THE PREPARATION OF POLYAMINOCARBOXYLIC ACIDS AND CHELATE COMPOUNDS THEREOF

(71) Applicant: VALAGRO S.P.A., Atessa (IT)

(72) Inventor: Alessandro Biasone, Pescara (IT)

(73) Assignee: VALAGRO S.P.A., Atessa (IT)

( * ) Notice: Subject to any disclaimer, the term of this patent is extended or adjusted under 35 U.S.C. 154(b) by 754 days.

(21) Appl. No.: 17/782,002

(22) PCT Filed: Dec. 2, 2020

(86) PCT No.: PCT/IB2020/061362
§ 371 (c)(1),
(2) Date: Jun. 2, 2022

(87) PCT Pub. No.: WO2021/111317
PCT Pub. Date: Jun. 10, 2021

(65) Prior Publication Data
US 2023/0036250 A1    Feb. 2, 2023

(30) Foreign Application Priority Data

Dec. 3, 2019 (IT) .................. 102019000022833

(51) Int. Cl.
*C07F 15/02* (2006.01)
(52) U.S. Cl.
CPC .................. *C07F 15/025* (2013.01)
(58) Field of Classification Search
CPC .................. C07F 15/02; C07F 15/025
See application file for complete search history.

(56) References Cited

U.S. PATENT DOCUMENTS

| | | | | | |
|---|---|---|---|---|---|
| 3,428,558 A | * | 2/1969 | Murphy | ............... | C02F 1/5227 524/424 |
| 3,567,752 A | * | 3/1971 | Israily | ............... | C07F 15/025 556/148 |
| 3,903,119 A | * | 9/1975 | Petree | ............... | C05D 9/02 556/139 |
| 3,981,712 A | * | 9/1976 | Petree | ............... | C05D 9/02 556/139 |
| 4,130,582 A | * | 12/1978 | Petree | ............... | C07C 227/18 562/448 |
| 2007/0261453 A1 | * | 11/2007 | McKenzie | ............... | C05D 9/02 71/27 |
| 2010/0022394 A1 | * | 1/2010 | Sierra | ............... | C07C 251/24 562/443 |

FOREIGN PATENT DOCUMENTS

| | | | | | |
|---|---|---|---|---|---|
| EP | 331556 A | * | 9/1989 | ......... | C07C 227/10 |
| EP | 3406590 A1 | * | 11/2018 | ......... | C05D 9/02 |
| ES | 2044777 A | * | 1/1994 | | |
| ES | 2044777 A1 | | 1/1994 | | |
| GB | 1205686 A | * | 9/1970 | ......... | C07C 255/00 |
| WO | WO-2006045852 A1 | * | 5/2006 | ......... | C07C 227/18 |

OTHER PUBLICATIONS

N. G. Anderson, Practical Process & Research Development, 113-143, 269-289 (2000) (Year: 2000).*
Written Opinion of the International Searching Authority and International Search Report for International Application No. PCT/IB2020/061362, mailed Jan. 29, 2021.

* cited by examiner

*Primary Examiner* — Alexander R Pagano
(74) *Attorney, Agent, or Firm* — BakerHostetler; Toni-Junell Herbert

(57) ABSTRACT

The present invention relates to a process for the preparation of polyaminocarboxylic acids, in particular phenolic aryl- or alkyldiaminepolycarboxylic acids, preferably a compound of formula (I): wherein X is selected from the group consisting of: H, COOH, COO$^-$Y$^+$, OH, linear or branched $C_1$-$C_5$ alkyl, $CH_2OH$, $SO_3H$, $SO_3^-Y^+$, wherein: —Y$^+$ is independently selected from the group consisting of: Li$^+$, Na$^+$, K$^+$, and $NH_4^+$; and wherein A is selected from: —A $(CH_2)n$ linear aliphatic system, wherein n=2, 3 or 4, preferably 2 or 3; and —an aromatic system of formula (II): wherein R1, R2 are independently selected from the group consisting of H, OH, and linear or branched $C_1$-$C_5$ alkyl; said process comprising the step of reacting, a phenol compound, glyoxylic acid and an aryl- or alkyldiamine in the presence of an iron source to obtain a reaction mixture comprising the compound of formula (I). The invention also relates to a process for the preparation of a chelate compound, which is a complex of the compound of formula (I) with iron.

19 Claims, 2 Drawing Sheets

PROCESS FOR THE PREPARATION OF POLYAMINOCARBOXYLIC ACIDS AND CHELATE COMPOUNDS THEREOF

CROSS-REFERENCE TO RELATED APPLICATIONS

This application is a 371 National Stage application of International Application No. PCT/IB2020/061362 filed Dec. 2, 2020, which claims the benefit of IT 102019000022833, filed Dec. 3, 2019, the entire contents of these applications are hereby incorporated by reference.

TECHNICAL FIELD

The present invention relates to a process for the preparation of polyaminocarboxylic acids, in particular phenolic aryl- or alkyldiaminepolycarboxylic acids, which comprises using a Fe source during the synthesis step. The present invention also relates to a process for the preparation of chelate compounds which are the corresponding complexes of said polyaminocarboxylic acids with Fe.

BACKGROUND ART

In agriculture iron chelate compounds are widely used to treat iron chlorosis affecting plants growing in calcareous and/or alkaline soils. Aromatic polyaminocarboxylates such as ethylenediamine-N,N'-bis(2-hydroxyphenylacetic acid) (EDDHA) and its derivates: ethylenediamine-N,N'-bis[(2-hydroxy 5-sulfo) phenylacetic acid] (EDDHSA), ethylenediamine-N,N'-bis(2-hydroxy-4-methylphenylacetic acid) (EDDHMA), ethylenediamine-N,N'-bis[(2-hydroxy-5-chlorophenyl)acetic acid] (EDDHCA), are chelating compounds able to chelate iron and largely used in agriculture for the prevention and/or treatment of chlorosis disease in plants.

They are normally synthesized from their respective phenolic precursors, ethylenediamine and glyoxylic acid through a Mannich-like one-pot reaction. The known synthesis processes to produce EDDHA, EDDHSA, EDDHMA, EDDDHA EDDHCA yield their respective racemic (RR, SS) and meso (RS, SR) isomers.

One of the side effects of the known processes is the further reaction of the desired products with the starting reagents to generate oligomeric products (OP).

Despite their stability in aqueous solution, such oligomeric products are less stable in soils and soil material, in particular in calcareous soils; therefore, they are less effective as fertilizer than the non-oligomeric compounds.

Although for EDDHA the formation of ortho-para and para-para regioisomers is a relevant issue, for EDDHSA, EDDHCA or EDDDHA, this problem is hampered by the presence of the sulfonic, carboxylic and hydroxyl groups respectively, which are in para position of the phenolic ring.

As described, for example, by Petree et al. in U.S. Pat. No. 4,130,582, for the synthesis of EDDHA, the formation of ortho-para and para-para isomers and oligomeric products is prevented by using a large excess of phenol.

The phenol excess is then removed with extraction in organic solvent. This approach has the great disadvantage that a large excess of phenol is required to limit the formation of the unwanted o,p-EDDHA and p,p-EDDHA isomers, thus leading to a reaction mixture unsuitable for the final chelation step with a Fe(II/III) salt without prior removal of the phenol excess. In case of EDDHSA and EDDHCA synthesis, the removal of unreacted phenol with an organic solvent is not feasible; hence the syntheses are carried out in nearly stoichiometric conditions using 2 mol of the phenolic reactant, 2 mol of glyoxylic acid and 1 mol of alkyldiamine in aqueous solution. The formation of significant amount of oligomeric product (EDDHSA-OP, EDDCA-OP) is unavoidable and, in some cases, their concentration in the finished products exceeds that of the desired chelating compound.

In agriculture there is still a strong need for alternative processes for the preparation of polyaminocarboxylic acids, in particular phenolic aryl- or alkyldiaminepolycarboxylic acids and the corresponding Fe chelate compounds which can limit the formation of undesired by-products such as condensation by-products and unwanted isomers.

An object of the present invention is to provide a process for the preparation of polyaminocarboxylic acids, in particular a phenolic aryl- or alkyldiaminepolycarboxylic acid and a corresponding Fe chelate compound which overcomes the disadvantages of the processes known in the art and leads to an increase of the yield of the chelating agent, especially of the racemic stereoisomers that show a higher stability constant with Fe with respect to the meso isomers, and to a reduction of the condensation by-products.

SUMMARY OF THE INVENTION

The present invention relates to a process for the preparation of polyaminocarboxylic acids, preferably phenolic aryl- or alkyldiaminepolycarboxylic acids, more preferably for the preparation of a compound of general formula (I):

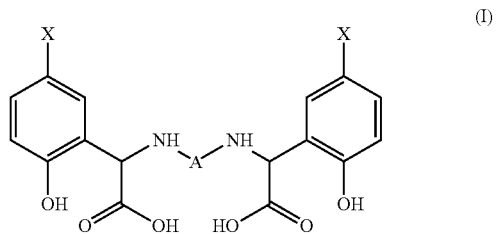

(I)

wherein X is selected from the group consisting of: H, COOH, COO⁻Y⁺, OH, linear or branched $C_1$-$C_5$ alkyl, $CH_2OH$, $SO_3H$, $SO_3^-Y^+$, wherein:
  $Y^+$ is independently selected from the group consisting of: $Li^+$, $Na^+$, $K^+$, and $NH_4^+$; and wherein
A is selected from:
  a $(CH_2)_n$ linear aliphatic system, wherein n=2, 3 or 4, preferably 2 or 3; and
  an aromatic system of formula:

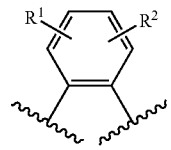

wherein R1, R2 are independently selected from the group consisting of H, OH, and linear or branched $C_1$-$C_5$ alkyl;
said process comprising the step of reacting, a phenol compound, glyoxylic acid and an aryl- or alkyldiamine in the presence of an iron source, preferably selected among metallic iron and an iron salt, to obtain a reaction mixture comprising the compound of general formula (I).

The present invention also relates to a process for the preparation of a chelate compound, which is a complex of the compound of formula (I) with iron, comprising the step of adding an iron source, preferably selected among metallic iron and an iron salt, to the reaction mixture comprising the compound of formula (I).

DETAILED DESCRIPTION OF THE INVENTION

Figure 1:
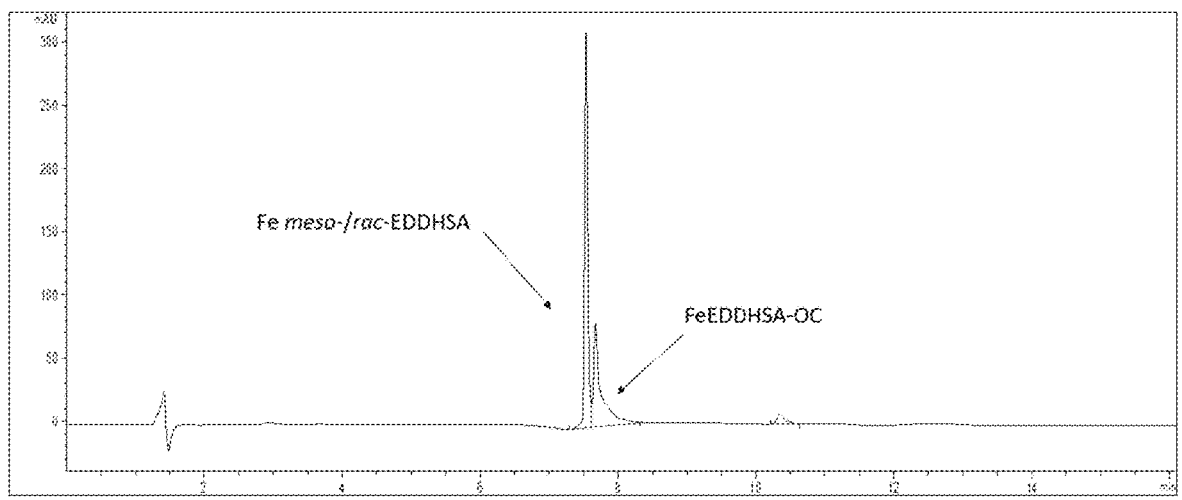
FIG. 1 shows a chromatogram of the chelate compound FeEDDHSA as obtained in Example 0 said chromatogram being acquired according to the official method EN 15451: 2008.

In the context of the present invention, the compound of general formula (I) is also referred to as "chelating agent" or "chelating compound" for Fe (iron). After the chelation reaction of the compound of general formula (I) with Fe, the so called "chelate compound" is obtained.

The present invention relates to a process for the preparation of a compound of general formula (I):

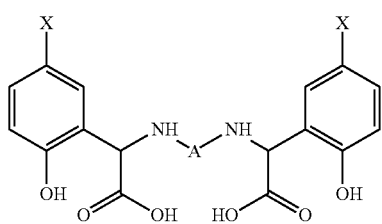
(I)

wherein X is selected from the group consisting of: H, COOH, COO⁻Y⁺, OH, linear or branched $C_1$-$C_5$ alkyl, $CH_2OH$, $SO_3H$, $SO_3^-Y^+$, wherein:
  $Y^+$ is independently selected from the group consisting of: $Li^+$, $Na^+$, $K^+$, and $NH_4^+$;
and wherein A is selected from:
  a $(CH_2)_n$ linear aliphatic system, wherein n=2, 3 or 4, 2 or 3;

and an aromatic system of formula:

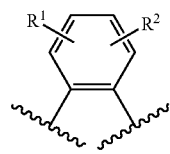

wherein R1, R2 are independently selected from the group consisting of H, OH, and linear or branched $C_1$-$C_5$ alkyl:
said process comprising the steps of:
  (a) reacting a phenolic precursor, glyoxylic acid and an aryl- or alkyldiamine;
  (b) adding an iron source, preferably said iron source being selected among metallic iron $Fe^0$ and an iron (II) and/or (III) salt;
  (c) mixing to obtain a reaction mixture comprising the compound of general formula (I).

According to a preferred embodiment, the present invention relates to a process for the preparation of a compound of general formula (Ia), wherein X is $SO_3H$ or $SO_3^-Y^+$ and $Y^+$ is independently selected from: $Li^+$, $Na^+$, $K^+$, and $NH_4^+$, preferably $Y^+$ is $Na^+$ or $K^+$.

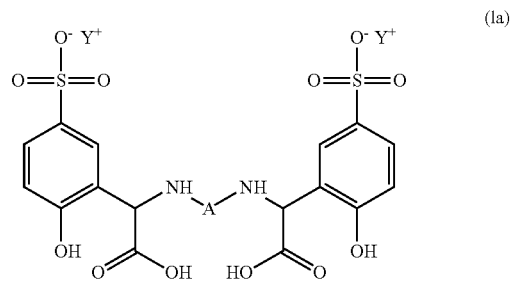
(Ia)

Preferably, the phenolic precursor of step (a) is selected from the group consisting of: phenol, hydroquinone, p-cresol, p-hydroxybenzoic acid, p-phenolsulfonic acid and salts thereof.

Preferably, the phenolic precursor of step (a) is selected from: a salt of p-hydroxybenzoic acid and a salt of p-phenolsulfonic acid, wherein the salt of p-hydroxybenzoic acid or p-phenolsulfonic acid is an alkali salt, even more preferably the salt is selected from the group consisting of sodium p-hydroxybenzoate, potassium p-hydroxybenzoate, sodium p-phenolsulfonate and potassium p-phenolsulfonate.

Preferably, the phenolic precursor, glyoxylic acid and aryl- or alkyldiamine are employed in a molar ratio comprised between 2.2:2.2:1 and 1.8:1.8:1.

According to a preferred embodiment of the invention, the reaction of step (a) is carried in an aqueous environment which is preferably an aqueous basic environment obtained by adding a base, preferably dropwise, to the aqueous environment of the reaction.

Preferably said base is selected from the group consisting of: NaOH, KOH, LiOH, $NH_4OH$ and combinations thereof.

Preferably said base is employed in excess, said excess being preferably calculated with respect to the amount of the phenolic precursor, glyoxylic acid and aryl- or alkyldiamine employed in the reaction of step (a).

According to a preferred embodiment of the present invention, the molar ratio of said base to aryl- or alkyldiamine is comprised between 2:1 and 7:1, even more preferably between 3:1 and 7:1.

According to another preferred embodiment of the invention, step (a) is carried out by first reacting, preferably in water, the phenolic precursor and glyoxylic acid and then, adding the base followed by the aryl- or alkyldiamine.

Preferably, the process of the present invention, comprises a step (a') of heating the reaction mixture of step (a) to a temperature comprised between 50 and 85° C., preferably between 60 and 75° C.

Preferably the aryl- or alkyldiamine employed in step (a) of the present invention is selected from the group consisting of: ethylenediamine, propane-1,3-diamine, butane-1,4-diamine, benzene-1,2-diamine.

According to an embodiment of the invention, step (a) comprises reacting an aryldiamine, preferably a benzene-1,2-diamine.

According to a preferred embodiment of the invention, step (a) comprises reacting an alkyldiamine, preferably selected from ethylenediamine, propane-1,3-diamine, butane-1,4-diamine, more preferably ethylenediamine.

Preferably the iron source employed in step (b) of the present invention is selected among metallic iron $Fe^0$ and an iron salt; more preferably said iron source is an iron salt.

According to a preferred embodiment of the present invention, said iron salt is Fe(II) and/or Fe(III) salt, preferably is a Fe(III) salt.

Preferably the Fe(II) salt is selected from the list consisting of: $FeSO_4$, $(NH_4)_2Fe(SO_4)_2$, $FeCl_2$, Fe(II) citrate, Fe (II) oxalate, their hydrated forms and combinations thereof.

The preferred Fe(III) salt is selected from the list consisting of: $Fe_2(SO_4)_3$, $FeNO_3$, $FeCl_3$, $FePO_4$, $FeNH_4SO_4$, Fe(III) citrate, Fe(III)oxalate, their hydrated forms and combinations thereof.

Preferably, said iron source is added to the reaction mixture of step (a) portion wise.

According to a particularly preferred embodiment of the invention, the iron source added in step (b) is employed in a molar ratio with respect to the aryl- or alkyldiamine comprised between 0.1:1 and 0.5:1, preferably comprised between 0.15:1 and 0.4:1, even more preferably between 0.2:1 and 0.35:1.

Advantageously, adding said iron source during the synthesis of the compound of general formula (I), transforms the Mannich-like reaction between the phenolic precursor (P), glyoxylic acid (GA) and aryl- or alkyldiamine from a three-component reaction (P-GA-(aryl- or alkyldiamine)) to a four-component reaction (P-GA-(aryl- or alkyldiamine)-Fe(0, II, III)). Below a reaction Scheme (I) is shown referred to a preferred embodiment of the invention, wherein the alkyldiamine is ethylenediamine (EDA):

Scheme (II): Synthesis of the chelating compound of formula (I) [step (a) and (b) according to an embodiment of the present invention].

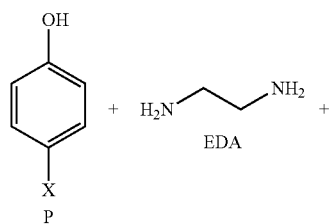

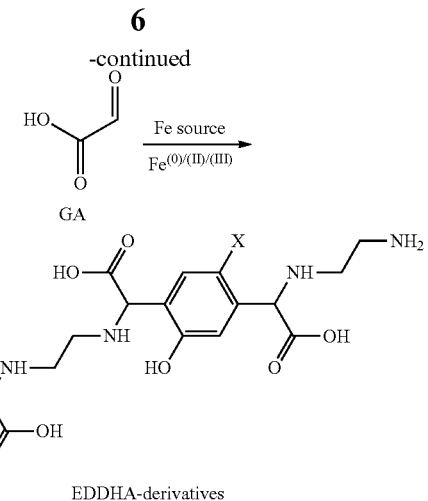

EDDHA-derivatives

Without wishing to be bound to a specific theory, the Applicant has found that the addition of said iron source in said specific amount during the synthesis process of the compound of general formula (I), causes a partial complexation that allows to effectively and correctly orient the synthesis towards the desired meso-/racemic isomers of the chelating compound of formula (I), with a reduction of undesired further condensation reactions. Therefore, adding said iron source not only advantageously increases the overall yield of the chelating compound of formula (I) thus significantly reducing the amount of condensation products (i.e. oligomeric products—Formula (II)):

Formula (II)

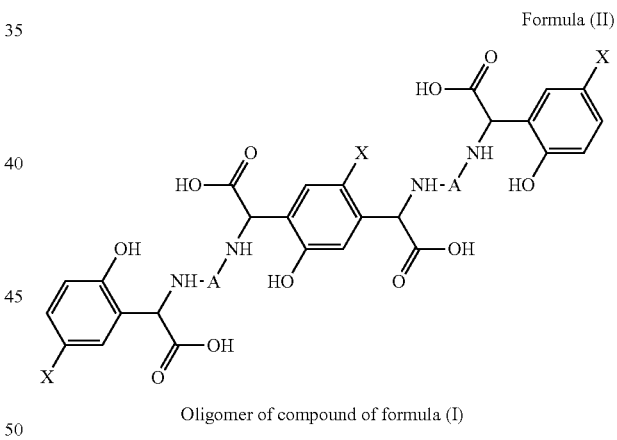

Oligomer of compound of formula (I)

but also, preferably increases the amount of the desired racemic isomers (RR, SS) products with respect to the meso isomers (RS, SR), whose stability with Fe, once they are completely chelated, has been demonstrated to be worse.

Furthermore, it can be envisaged that, if in step (b) said iron source is added in an amount with respect to the aryl- or alkyldiamine exceeding the molar ratio between 0.1:1 and 0.5:1, preferably comprised between 0.15:1 and 0.4:1, even more preferably between 0.2:1 and 0.35:1, as described above, the pH of the reaction will shift to acidic values and other unwanted reactions involving the organic reagents and Fe may occur.

According to a preferred embodiment of the invention the mixing of step (c) is performed for a time comprised between 1 and 4 hours, preferably between 2 and 3 hours, in order to obtain a reaction mixture and ensuring the completion of the reaction. Preferably said step (c) is carried out at a temperature comprised between 50 and 90° C., preferably between 55 and 85° C.

Preferably said mixing comprises stirring and/or shaking.

Preferably, the process of the present invention, comprises a step (c') of cooling the reaction mixture of step (c) down to a temperature comprised between 30 and 50° C., preferably between 35 and 45° C.

Preferably, at the end of step (c) or (c'), the resulting reaction mixture is a homogeneous mixture, preferably a homogeneous aqueous solution, comprising the compound of general formula (I).

The present invention also relates to a process for the preparation of a chelate compound, which is the complex of the compound of formula (I) with Fe, said process comprising the steps of:
(d) adding an iron source to the reaction mixture obtained after step (c) or (c'); and
(e) mixing to complete the chelation reaction and obtain a reaction mixture comprising the chelate compound.

Preferably the iron source employed in step (d) is selected among metallic iron $Fe^0$ and an iron salt; more preferably said iron source is an iron salt. According to a preferred embodiment of the present invention, said iron salt is selected from a Fe(II) and/or a Fe(III) salt, preferably a Fe(II) salt. Preferably the Fe(III) salt is selected from the list consisting of: $Fe_2(SO_4)_3$, $FeNO_3$, $FeCl_3$, $FePO_4$, $FeNH_4SO_4$, Fe(III) citrate, Fe(III) oxalate, their hydrated forms and combinations thereof. More preferably the preferred Fe(II) salt is selected from the list consisting of: $FeSO_4$, $(NH_4)_2Fe(SO_4)_2$, $FeCl_2$, Fe(II) citrate, Fe (II) oxalate, their hydrated forms and combinations thereof.

Preferably, said iron source is added to the reaction mixture obtained after step (c) or (c') portion wise.

According to a particularly preferred embodiment of the invention, the iron source added in step (d) is employed in an amount depending from the quantity of the iron source added in step (b).

Preferably the total amount of the iron source added in steps (b) and (d) is in a molar ratio with respect to the aryl- or alkyldiamine of step (a) comprised between 0.7:1 and 1:1, preferably between 0.8:1 and 1:1, more preferably between 0.9:1 and 1:1, even more preferably equal to the stochiometric molar ratio 1:1.

In other words, according to a preferred embodiment of the invention, wherein the amount of the iron source added in steps (b) and (d) is in a molar ratio with respect to the aryl- or alkyldiamine of step (a) of 1:1, if the molar ratio of the iron source added in step (b) with respect to the aryl- or alkyldiamine of step (a) is 0.3:1, the molar ratio of the iron source added in step (d) with respect to the aryl- or alkyldiamine of step (a) is 0.7:1.

Preferably, at the end of step (e), a homogeneous mixture, preferably a homogeneous aqueous solution, comprising the chelate compound, is obtained, said chelate compound being the complex of the compound of formula (I) with Fe, preferably with Fe(III).

Preferably, the amount of iron source added in step (d) depends also on the final iron concentration in said chelate compound obtained at the end of step (e).

Preferably, the total amount of the iron source added in steps (b) and (d) results in a final iron concentration in the chelate compound obtained at the end of step (e) comprised between 5 and 9% by weight of the chelate compound, preferably comprised between 5.5 and 7.5% by weight of the chelate compound.

According to a preferred embodiment, the process of the present invention comprises a step (e') of adding a base to said reaction mixture of step (e) until the pH of said reaction mixture reaches a value comprised between 4 and 7, preferably between 5.5 and 6.5.

Preferably said base is selected from the group consisting of: NaOH, KOH, LiOH, $NH_4OH$ and combinations thereof.

According to another preferred embodiment of the invention, the process further comprises a step of:
(f) drying the reaction mixture of step (e) or (e') to obtain the final chelate compound in the form of a powder.

Without wishing to be bound to a specific theory, the Applicant has found that using a part of the total amount of iron source intended for chelation during the synthesis step of the chelating compound has the advantage of increasing the racemic isomer (RR,SS) which has a higher stability constant with Fe, preferably with Fe(III), with respect to the meso isomer (RS, SR). The overall effect is therefore the increase of the yield of the chelating agent, the reduction of condensation products and the increase of the racemic stereoisomer.

EXAMPLES

Example 0—Standard Synthesis of FeEDDHSA

The typical synthesis already employed in the field to prepare the Fe chelate compound of EDDHSA (FeEDDHSA) comprises the following steps.

To a 5 L flask equipped with a mechanical stirrer and reflux condenser, 2 mol of p-phenolsulfonic acid 65% w/w (APS), 27 mol of $H_2O$ and 2 mol of glyoxylic acid 50% w/w are introduces to obtain a homogeneous mixture. 4 mol of NaOH 50% solution are added dropwise to the mixture followed by the addition of 1 mol ethylenediamine via a syringe needle. The reaction is heated to 80° C. and is stirred for 2 hours. The final mixture is cooled down to 40° C. 1 mol of iron(II) sulfate hydrate ($Fe(SO_4)\cdot xH_2O$) is added to the mixture and the final solution is stirred to complete the chelation process. NaOH is added dropwise to bring the pH at 6. The final solution is dried to achieve the final chelate (FeEDDHSA_0).

Example 1—Synthesis of FeEDDHSA According to the Present Invention

To a 5 L flask equipped with a mechanical stirrer and reflux condenser, 2 mol of p-phenolsulfonic acid 65% w/w (APS), 27 mol of $H_2O$ and 2 mol of glyoxylic acid 50% w/w are introduced to obtain a homogeneous mixture. 6 mol of NaOH 50% solution are added dropwise to the mixture followed by the addition of 1 mol of ethylenediamine 100% via a syringe needle.

The reaction is heated to 60° C. and 0.3 mol of iron(III) sulfate hydrate ($Fe_2(SO_4)_3\cdot xH_2O$) are added portion wise to the mixture. The reaction is stirred for 2 hours at 80° C. The final mixture is cooled down to 40° C. 0.7 mol of iron(II) sulfate hydrate ($Fe(SO_4)\cdot xH_2O$) are added to the mixture and the final solution is stirred to complete the chelation process. NaOH is added dropwise to bring the pH at 6. The final solution is dried to achieve the final chelate (FeEDDHSA_1).

Example 2—Synthesis of FeEDDHSA According to the Present Invention

To a 5 L flask equipped with a mechanical stirrer and reflux condenser, 2 mol of sodium p-phenolsulfonate 68% w/w (NaAPS), 32 mol of H$_2$O and 2 mol of glyoxylic acid 50% w/w are introduced to obtain a homogeneous mixture. 4 mol of NaOH 50% solution are added dropwise to the mixture followed by the addition of 1 mol of ethylenediamine via a syringe needle. The reaction is heated to 60° C. and 0.3 mol of iron(III) sulfate hydrate (Fe$_2$(SO$_4$)$_3$·xH$_2$O) are added portion wise to the mixture. The reaction is stirred for 2 hours at 80° C. The final mixture is cooled down to 40° C. 0.7 mol of iron(II) sulfate hydrate (Fe(SO$_4$)·xH$_2$O) are added to the mixture and the final solution is stirred to complete the chelation process. The final solution is dried to achieve the final chelate (FeEDDHSA_2).

Example 3—Synthesis of FeEDDHSA According to the Present Invention

To a 5 L flask equipped with a mechanical stirrer and a reflux condenser, 2 mol of potassium p-phenolsulfonate 68% w/w, 32 mol of H$_2$O and 2 mol of glyoxylic acid 50% w/w are introduced to obtain a homogeneous mixture. 4 mol od NaOH 50% solution are added dropwise to the mixture followed by the addition of 1 mol of ethylenediamine via a syringe needle. The reaction is heated to 60° C. and 0.3 mol of iron(III) sulfate hydrate (Fe$_2$(SO$_4$)$_3$·xH$_2$O) are added portion wise to the mixture. The reaction is stirred for 2 hours at 80° C. The final mixture is cooled down to 40° C. 0.7 mol of iron(II) sulfate hydrate (Fe(SO$_4$)·xH$_2$O) are added to the mixture and the final solution is stirred to complete the chelation process. The final solution is dried to achieve the final chelate (FeEDDHSA_3).

Example 4—Chemical Analysis

The official method to analyze the quality of EDDHSA compounds and the corresponding chelate compounds FeEDDHSA, is EN 15451:2008 where a standard of certified purity of ethylenediamine-di-(o-hydroxysulfophenyl) acetic acid and its condensation products (CAS-No. 57368-07-7 and 642045-40-7) is used.

This method consists in using ion-pair chromatography coupled to UV-Visible spectroscopy for the determination of the sum of meso-/rac-FeEDDHSA and the sum of FeEDDHSA oligomeric fraction (FeEDDHSA-OC).

The chelated compounds obtained as described in Examples 0, 1 and 2 (FeEDDHSA_0, FeEDDHSA_1 and FeEDDHSA_2) along with two others commercially available FeEDDHSA chelate compounds (FeEDDHSA_Reference1 and FeEDDHSA_Reference2) have been analyzed with the above-mentioned method. For the commercially available compounds (FeEDDHSA_0, FeEDDHSA_Reference1 and FeEDDHSA_Reference2) the standard used in the EN method is not a rac-/meso-EDDHSA with certified purity but a mixture of EDDHSA and EDDHSA-OC titrated photometrically, which is also in accordance with the method.

From the acquired chromatograms, it was possible to calculate the amount of chelated Fe present in the different chelate compounds and at the same time clearly distinguish the Fe meso-/rac-EDDHSA compounds from the Fe-EDDHSA oligomers. An example of said chromatograms is shown in FIG. 1 (relative to the chelate compound FeEDDHA_0 of Example 0), wherein two distinct chromatographic peaks for the Fe meso-/rac-EDDHSA fraction and for the oligomeric fraction are visible.

Table 1 shows the % amount of chelated iron for the different samples.

TABLE 1

| Chelate compound | Fe % ρ EDDHSA | Fe % ρ EDDHSA-OC | Sum Fe % ρ EDDHSA + EDDHSA-OC |
|---|---|---|---|
| FeEDDHSA_0 | 1.68 | 1.45 | 3.13 |
| FeEDDHSA_1 | 2.19 | 1.38 | 3.57 |
| FeEDDHSA_2 | 2.77 | 1.38 | 4.15 |
| FeEDDHSA_Reference1 | 1.37 | 1.96 | 3.33 |
| FeEDDHSA_Reference2 | 1.73 | 2.02 | 3.75 |

It appears clear from the above results, that the process according to the present invention effectively limits the formation of the condensation products (i.e. oligomeric compounds) and allows increasing the concentration of the desired chelating compound.

Figure 2:
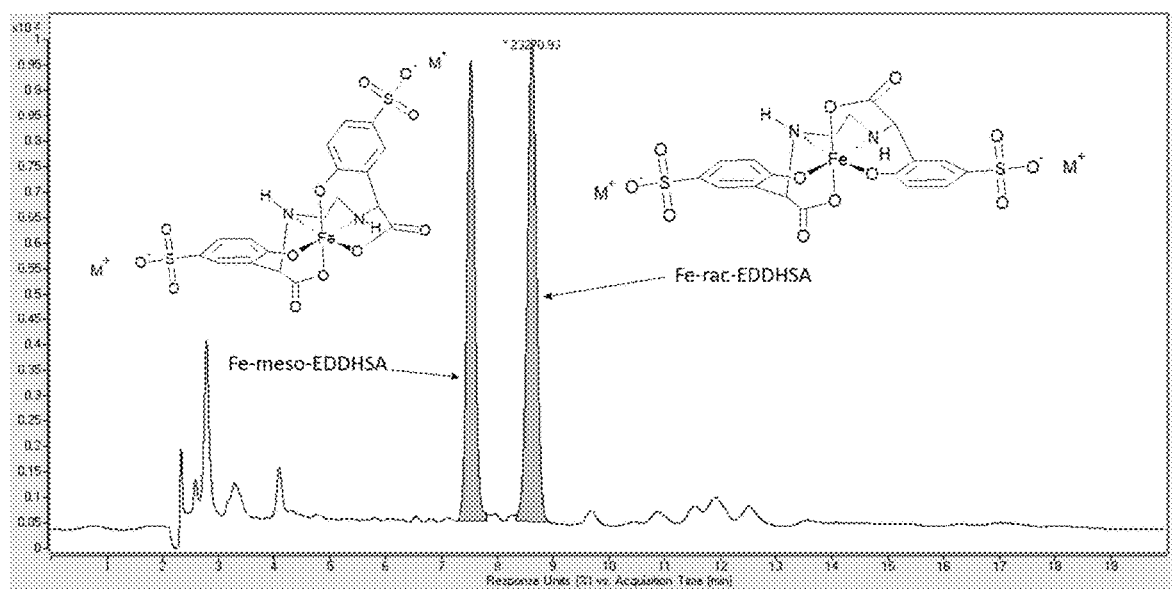
FIG. 2 shows a chromatogram of the chelate compound FeEDDHSA as obtained in Example 0, wherein the two FeEDDHSA isomers are well revolved; said chromatogram being acquired according to the analytical method reported in "A. Biasone et al., Journal of Chromatography A, 1282 (2013) 142-152".
Figure 3:
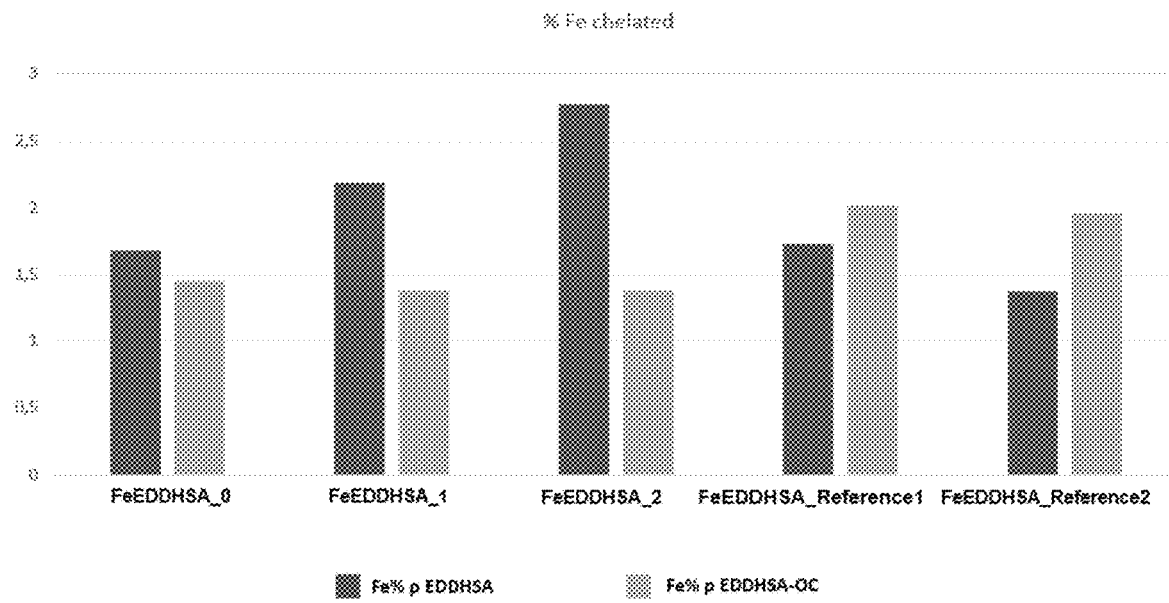
FIG. 3 shows a graphic which reports the amount of Fe chelated with meso-/rac-EDDHSA and with the oligomeric compounds thereof (Fe % p of EDDHSA and Fe % p EDDHSA-OC), comparing the different results of the chelate compounds obtained with the process of the present invention (FeEDDHSA_1 and FeEDDHSA_2) with those of three different commercially available FeEDDHSA compounds (FeEDDHSA_0, FeEDDHSA_Reference1 and FeEDDHSA_Reference2).
Figure 4:
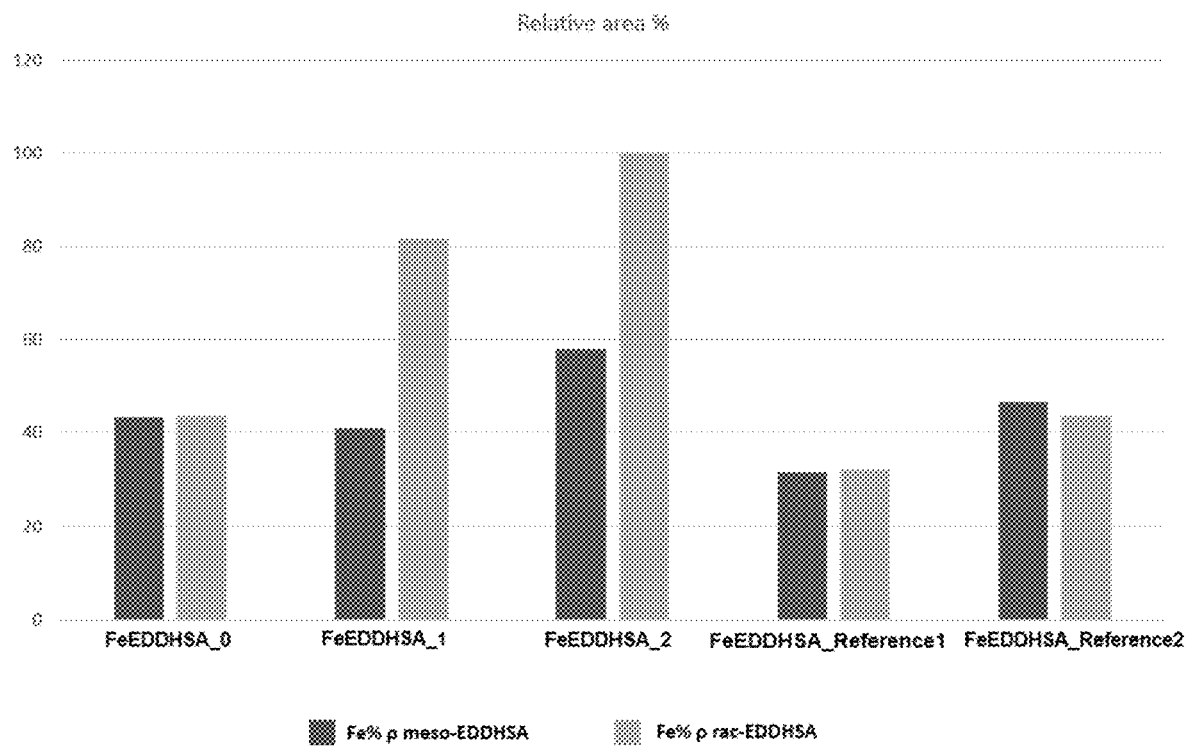
FIG. 4 shows a graphic which reports, expressed as relative area %, the amount of Fe chelated with meso-EDDHSA and with rac-EDDHSA, comparing the different results of the chelate compounds obtained with the process of the present invention (FeEDDHSA_1 and FeEDDHSA_2) with those of three different commercially available FeEDDHSA compounds (FeEDDHSA_0, FeEDDHSA_Reference1 and FeEDDHSA_Reference2).

As shown in the Table (II) and in FIG. 2 as well, following the analytical method reported in "A. Biasone et al. «Characterization and quantification of racemic and meso-ethylenediamine-N,N'-bis(2-hydroxy-5-sulfophenylacetic) acid/iron (III) by ion-pair ultra-high performance liquid chromatography coupled with diode array detector and electrospray tandem mass spectrometry», Journal of Chromatography A, 1282 (2013) 142-152", it was also possible to discriminate and separately quantify the % of chelated Fe present in the meso and racemic isomers, and, therefore at the same time clearly distinguish the Fe-meso-EDDHSA compound from the Fe-rac-EDDHSA oligomers (which are the preferred ones, being more stables Fe(III) complexes).

An example of one of the analyzed chromatograms is shown in FIG. 2 (relative to the chelate compound FeEDDHA_0 of Example 0), wherein two distinct chromatographic peaks for the Fe meso-EDDHSA chelate compound and for the Fe rac-EDDHSA are visible and resolved.

TABLE 2

| | Relative area % 480 nm | |
|---|---|---|
| Chelate compound | Fe % ρ meso-EDDHSA | Fe % ρ rac-EDDHSA |
| FeEDDHSA_0 | 43.3 | 43.6 |
| FeEDDHSA_1 | 41.1 | 81.8 |
| FeEDDHSA_2 | 58.0 | 100.0 |
| FeEDDHSA_Reference1 | 31.7 | 32.1 |
| FeEDDHSA_Reference2 | 46.7 | 43.7 |

The above results clearly demonstrate that the process according to the present invention not only effectively increases the overall yield of the desired chelating compound thus reducing the oligomeric by-products, but also it particularly increases the yield of the racemic stereoisomer, which, as already stated above, is particularly preferred as it forms more stable Fe(III) complexes if compared to the meso isomer.

The invention claimed is:

1. A process for the preparation of a compound of general formula (I):

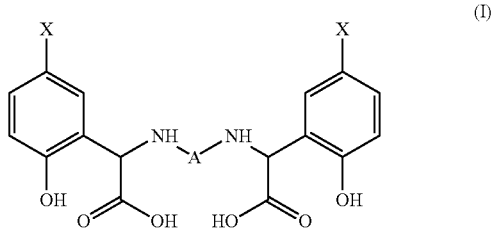

wherein

X is selected from the group consisting of: H, COOH, COO$^-$Y$^+$, OH, linear or branched $C_1$-$C_5$ alkyl, $CH_2OH$, $SO_3H$ and SO$^-$Y$^+$, wherein Y is independently selected from the group consisting of Li$^+$, Na$^+$, K$^+$, and NH$^+$; and; wherein A is selected from:

($CH_2$)$_n$ linear aliphatic system, wherein n=2, 3 or 4; and an aromatic system of formula:

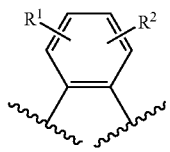

wherein $R_1$, $R_2$ are independently selected from the group consisting of H, OH, and linear or branched $C_1$-$C_5$ alkyl;

said process comprising the steps of:
(a) reacting a phenolic precursor with glyoxylic acid and an aryl- or alkyldiamine;
(b) adding an iron source in a molar ratio with respect to the aryl- or alkyldiamine of step (a) between 0.1:1 and 0.5:1, wherein the iron source is metallic iron Fe$^0$;
(c) mixing for a duration between 1 and 4 hours and at a temperature between 50° C. and 90° C. to obtain a reaction mixture comprising the compound of general formula (I).

2. The process according to claim 1, wherein the phenolic precursor of step (a) is selected from the group consisting of phenol, hydroquinone, p-cresol, p-hydroxybenzoic acid, p-phenolsulfonic acid and salts thereof.

3. The process according to claim 1, wherein the aryl- or alkyldiamine of step (a) is selected from the group consisting of ethylenediamine, propane-1,3-diamine, butane-1,4-diamine, and benzene-1,2-diamine.

4. The process according to claim 1, wherein said phenolic precursor, glyoxylic acid and aryl- or alkyldiamine are employed in a molar ratio between 2.2:2.2:1 and 1.8:1.8:1.

5. The process according to claim 1, wherein step (a) is carried out in an aqueous basic environment obtained by adding a base.

6. The process according to claim 5, wherein the molar ratio of said base to aryl- or alkyldiamine of step (a) is between 2:1 and 7:1.

7. The process according to claim 1, wherein the iron source added in step (b) is employed in a molar ratio with respect to the aryl- or alkyldiamine of step (a) between 0.15:1 and 0.4:1.

8. The process according to claim 1, wherein the mixing of step (c) is performed for a duration between 2 and 3 hours and at a temperature between 55° C. and 85° C.

9. A process for the preparation of a chelate compound of the compound of general formula (I) of claim 1 with Fe, said process comprising the steps of (a) to (c) according to claim 1 and further comprising:
(d) adding the iron source to the reaction mixture obtained after step (c) of the process according to claim 1;
(e) mixing to complete the chelation reaction and obtain a second reaction mixture comprising the chelate compound;
(f) optionally drying the second reaction mixture of step (e) to obtain the chelate compound in form of powder.

10. The process according to claim 9, wherein total amount of the iron source added in steps (b) and (d) is in a molar ratio with respect to the aryl- or alkyldiamine of step (a) between 0.7:1 and 1:1.

11. The process according to claim 1, wherein step (a) is performed in an aqueous basic environment.

12. The process according to claim 1, wherein the phenolic precursor is a salt of p-hydroxybenzoic acid or a salt of p-phenolsulfonic acid.

13. The process according to claim 12, wherein the salt of p-hydroxybenzoic or the salt of p-phenolsulfonic acid is each independently an alkali salt.

14. The process according to claim 1, wherein the phenolic precursor is selected from sodium p-hydroxybenzoate, potassium p-hydroxybenzoate, sodium p-phenolsulfonate, and potassium p-phenolsulfonate.

15. The process according to claim 5, wherein the base is selected from the group consisting of NaOH, KOH, LiOH, NH4OH, and a combination thereof.

16. The process according to claim 1, wherein the iron source added in step (b) is employed in a molar ratio with respect to the aryl- or alkyldiamine of step (a) between 0.2:1 and 0.35:1.

17. The process according to claim 9, wherein the total amount of the iron source added in steps (b) and (d) is in a molar ratio with respect to the aryl- or alkyldiamine of step (a) between 0.8:1 and 1:1.

18. The process according to claim 9, wherein the total amount of the iron source added in steps (b) and (d) is in a molar ratio with respect to the aryl- or alkyldiamine of step (a) between 0.9:1 and 1:1.

19. The process according to claim 9, wherein the total amount of the iron source added in steps (b) and (d) is in a molar ratio with respect to the aryl- or alkyldiamine of step (a) equal to the stochiometric molar ratio 1:1.

* * * * *